United States Patent
Doll et al.

(10) Patent No.: US 7,300,379 B2
(45) Date of Patent: Nov. 27, 2007

(54) DIFFERENTIAL WITH THIN FILM COATING AT CROSS SHAFT AND PROCESSES FOR MANUFACTURING THE SAME

(75) Inventors: Gary L. Doll, Jackson Township, Stark County, OH (US); Carl R. Ribaudo, Jackson Township, Stark County, OH (US); Ryan D. Evans, Jackson Township, Stark County, OH (US)

(73) Assignee: The Timken Company, Canton, OH (US)

( * ) Notice: Subject to any disclaimer, the term of this patent is extended or adjusted under 35 U.S.C. 154(b) by 312 days.

(21) Appl. No.: 10/983,551

(22) Filed: Nov. 8, 2004

(65) Prior Publication Data

US 2005/0130793 A1    Jun. 16, 2005

Related U.S. Application Data

(60) Provisional application No. 60/518,942, filed on Nov. 10, 2003.

(51) Int. Cl.
*F16H 57/08* (2006.01)

(52) U.S. Cl. .................. 475/331; 475/220; 475/230

(58) Field of Classification Search ............... 475/220, 475/230, 331; 384/912, 913, 907.1
See application file for complete search history.

(56) References Cited

U.S. PATENT DOCUMENTS

| | | | |
|---|---|---|---|
| 4,525,417 A | | 6/1985 | Dimigen et al. |
| 5,249,554 A | * | 10/1993 | Tamor et al. ............ 123/90.51 |
| 5,484,347 A | * | 1/1996 | Holmquist ................. 475/231 |
| 5,786,570 A | * | 7/1998 | Miya et al. ................. 219/469 |
| 5,941,647 A | * | 8/1999 | Koike et al. ................ 384/296 |
| 6,431,758 B1 | * | 8/2002 | Lyon et al. ................. 384/276 |
| 2003/0235006 A1 | * | 12/2003 | Ameen et al. ............ 360/99.08 |
| 2004/0031625 A1 | * | 2/2004 | Lin et al. .................... 175/371 |
| 2005/0064196 A1 | * | 3/2005 | Martin et al. ............... 428/408 |

FOREIGN PATENT DOCUMENTS

| | | |
|---|---|---|
| DE | 10061397 | 5/2002 |
| EP | 0971048 | 1/2000 |

(Continued)

OTHER PUBLICATIONS

Patent Cooperation Treaty "Written Opinion of the International Searching Authority" (PCT Rule 43bis. 1), Mar. 8, 2005, 5 pages.

(Continued)

*Primary Examiner*—David D. Le
(74) *Attorney, Agent, or Firm*—Polster, Lieder, Woodruff & Lucchesi, L.C.

(57) ABSTRACT

A process for improving the durability of a differential, where the differential has a pinion shaft and a pinion, the pinion shaft having a surface that contacts the surface of the inner diameter of the pinion. The process comprises bonding to the surface of the pinion shaft or the pinion or both, in the region of the interface between the pinion shaft and pinion, a coating having both a lower coefficient of friction and higher seizure resistance than that of the substance of the pinion shaft when in contact with the substance of the pinion.

7 Claims, 2 Drawing Sheets

| | FOREIGN PATENT DOCUMENTS | | |
|---|---|---|---|
| JP | 62171563 A | * | 7/1987 |
| JP | 05044059 | | 2/1993 |
| JP | 2003293136 | | 10/2003 |
| WO | 9714555 | | 4/1997 |

OTHER PUBLICATIONS

Japan Patent Bureau "Offocal Gazette" for Patent Application No. 55-8601 filed Jan. 28, 1980 entitled Differential pinion shaft, Aug. 31, 1981, 8 pages.

* cited by examiner

DIFFERENTIAL WITH THIN FILM COATING AT CROSS SHAFT AND PROCESSES FOR MANUFACTURING THE SAME

CROSS REFERENCE TO RELATED APPLICATIONS

This non-provisional application is converted from provisional U.S. application No. 60/518,942, filed Nov. 10, 2003, for the invention of Gary L. Doll, Carl R. Ribaudo and Ryan D. Evans, entitled "Differential Pinion Shaft With Thin Film Coating And Processes For Manufacturing The Same," and derives and claims priority from that application.

STATEMENT REGARDING FEDERALLY SPONSORED RESEARCH OR DEVELOPMENT

Not Applicable.

BACKGROUND OF THE INVENTION

This invention relates in general to mechanical differentials and more particularly to a pinion shaft within a vehicular differential having a thin film coating that provides a highly wear-resistant and low friction sliding surface, and processes for manufacturing the same. The coating generally comprises a metal- or silicon-containing carbon material that may be applied using various vapor deposition techniques.

Conventionally, when a low viscosity lubricant is used in the differential, high-grade carbon-Mo steel (e.g. JIS SCM 30-40) is used for the pinion shaft, and the shaft is carburized/quenched and soft-nitrided to provide a hardened surface to resist wear. Alternatively, the steel shaft is molybdenum flame-coated or plasma sprayed. However, while abrasive wear-resistance and surface durability is improved by surface hardening, such as soft-nitriding of the higher grade steel, seizure or adhesive wear resistance is not improved that much. On the other hand, although seizure-resistance is improved by molybdenum flame coating, abrasive wear resistance and surface durability are little improved.

Conventional ceramic coatings applied at a temperature lower than the normalizing temperature or surface-treatment temperature, such as of soft-nitriding, gas-nitriding, etc. have been used to improve the pinion shaft wear characteristics. These techniques are generally applied using various methods, such as reactive ion plating, plasma chemical vapor deposition or laser chemical vapor deposition, each applied at a treatment temperature of approximately 500 deg C.

The thickness of these conventional ceramic films is typically 1-20 microns, and preferably 2-10 microns. If it is thinner, improvement of seizure/wear resistance is insufficient and if it is thicker than preferred, the cost of the treatment increases too much. The ceramic used in such conventional techniques can vary widely, and may include materials such as TiN, Ti(C, N), Si3N4, TiC, SiC, Al2O3, etc. It is generally recognized that TiN, Ti (C, N), and Si3N4 are more effective for seizure resistance improvement and TiC, SiC, and Al2O3 are more effective for improvement of wear-resistance.

The base material of the pinion shaft is likewise variable, and can be composed of metals such as SAE/AISI steel types 1045 to 1080, 8620, and 4140 J for example. The heat treatment can be quenching/tempering, high-frequency quenching/tempering, carburizing/tempering or carburizing/nitriding/tempering etc. and soft-nitriding (salt bath or gas) or gas-nitriding can be applied after said heat treatment.

HV 400 or higher surface hardness of the base material underneath the coating is necessary. If softer, the contact stress may be sufficient to cause plastic deformation or cracking of the base material that would lead to the coating becoming detached from the base material. Further, the surface of the base material should be free of any brittle layer, such as a porous compound layer caused by nitriding. If a brittle layer is formed during processing, the ceramic coating must be applied after removal of the brittle layer. These considerations cause unacceptable costs or limit reliability and reduce the life of the differential.

Application of a phosphate treatment (Lubrite treatment) of the pinion is another conventional technique used to reduce the wear between the pinion shaft and pinion.

While all of these conventional techniques provide some improvement to wear of the pinion shaft, their improvements are limited and/or impose unnecessary or excessive costs. It is therefore desirable to have a pinion shaft with greater wear resistance without excessive additional cost.

BRIEF DESCRIPTION OF THE SEVERAL VIEWS OF THE DRAWINGS

The illustrative embodiments of the present invention are shown in the following drawings which form a part of the specification.

DESCRIPTION OF THE INVENTION

This invention concerns the use of metal- or silicon-containing carbon material coating, generally referred to as diamond-like coating ("DLC"), with metal or silicon levels not exceeding approximately 35 atomic weight % in the top layer.

Figure 1:
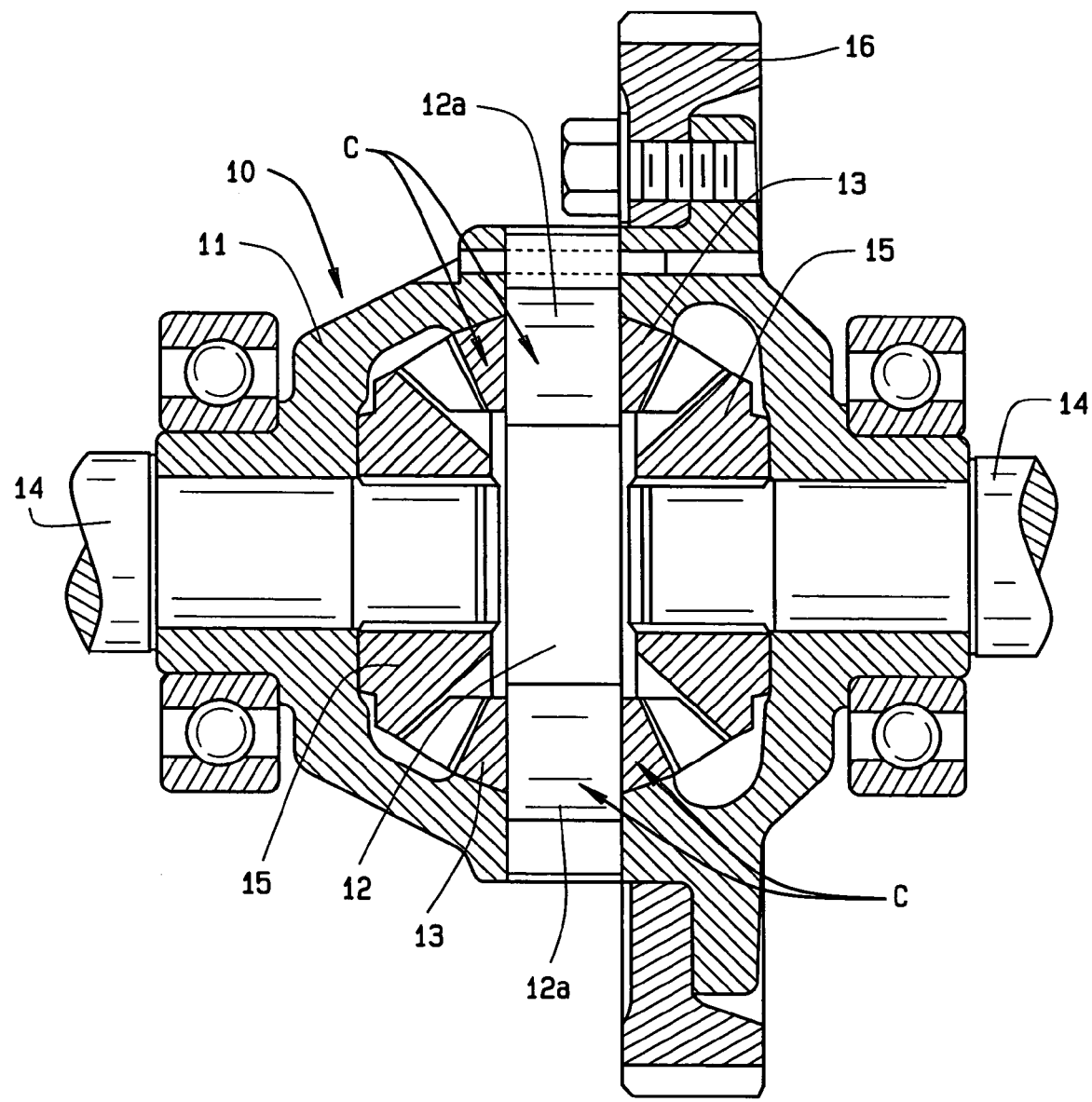
FIG. 1 is a longitudinal cross-section of a differential provided with a pinion shaft constructed in accordance with the present invention.

As can be seen in FIG. 1, a typical vehicular differential 10 comprises a rotatable housing 11 through which a pinion shaft 12 (also known as "cross shaft") extends. The pinion shaft 12 carries pinions 13, the pinions 13 being positioned generally in contact with and in relation to the pinion shaft 12 as shown. A sliding contact region 12a is located along the pinion shaft 12 where the pinions 13 contact the pinion shaft 12. The differential 10 at each end of the housing 11 has a side gear 15. Torque is applied to the housing 11 through a ring gear 16. Of course, the present invention is not limited to differentials of this design as in FIG. 1, but may be used in any differential having pinion shafts, beveled pinions and side gears (also known as "bevel gears"), regardless of specific design.

In the first embodiment of the present invention, a metal- or silicon-containing carbon coating C is applied to the outer diameter of pinion shaft 12 over an area that includes at least the sliding contact region 12a, formed between the pinion shaft 12 and pinions 13. Of course, the coating C may alternatively be applied to the inner diameter of pinions 13, where the pinion shaft 12 contacts pinions 13, or the coating C may be applied to both pinion shaft 12 and pinions 13. The carbon coating C is formed into an amorphous matrix and may contain chromium, titanium, tungsten; and/or silicon, and/or associated carbides of those elements. The metal or silicon content should not exceed 35 atomic weight % in the top layer, and should preferably be between 5 and 20%, with the balance of the top layer composition essentially being carbon in the preferred embodiment, although the top layer may also contain hydrogen. Such films are referred to as metal-containing diamond-like carbon coatings or more generally "DLC" films. Optionally, the carbonaceous top layer may be deposited on a metallic bond layer of chromium, titanium or silicon or other metal for increased substrate adhesion.

Figure 2:
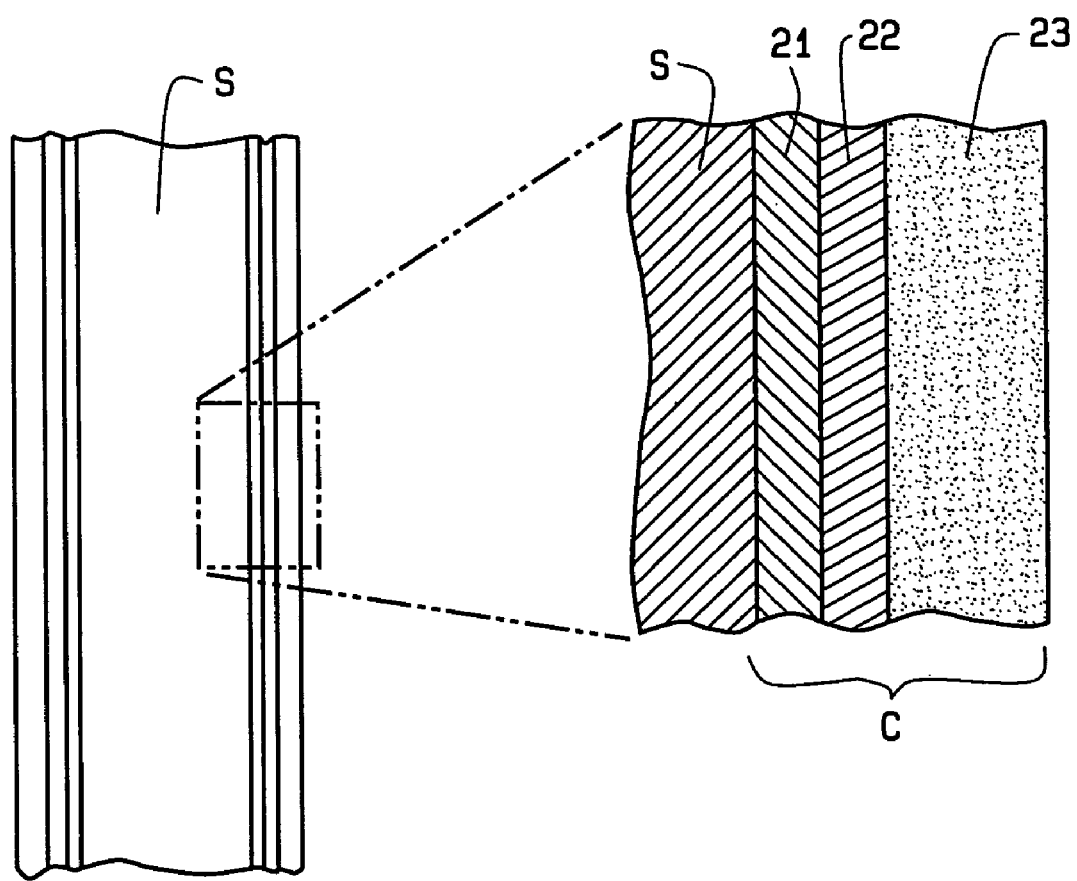
FIG. 2 is a cross-sectional view with magnified insert of an embodiment of the present invention depicting a portion of a surface of a component within a typical differential having a thin film coating as disclosed, the magnified insert depicting in further detail said coating.

The thin film coating C of the first embodiment is shown in FIG. 2 adhered to a surface S. Depending on the application, the surface S may represent the surface of either the pinion shaft 12 or the pinions 13. In the first embodiment described herein, the surface S represents the surface of the pinion shaft 12. The coating C comprises an adhesion layer 21, a gradient layer 22 and a top layer 23. The top layer 23 is a metal- or silicon-containing carbon material, being between 0.5 and 5.0 microns, and preferably less than 3 microns thick, and containing less than 35, and preferably between 5 and 20, atomic weight % metal or silicon. The adhesion layer 21 is applied to the surface S of the pinion shaft 12, which is typically composed of a carbon, microalloy, low alloy, structural or tool steel. The gradient layer 22 is deposited atop the adhesion layer 21 and the top layer 23 is applied atop the gradient layer 22. The adhesion layer 21 may consist of a number of materials, including chromium, titanium or silicon. The adhesion layer 21 enhances the adhesion between the coating C and the surface S through physical and chemical bonding. The gradient layer 22 provides a stress-relieving buffer zone in the form of a gradual compositional transition from material comprising the adhesion layer 21 to the material comprising the top layer 23. The gradient layer 22 minimizes otherwise inherent mechanical weaknesses in the coating caused by interlayer stresses. The top layer 23 lends the desired characteristics of low friction, high hardness, and high seizure resistance to the surface S of the pinion shaft 12.

Some of the advantages of the current invention relative to conventional wear-reducing techniques, and listed without limitation, are:

1. Increased abrasion resistance;
2. Increased seizure resistance;
3. Low abrasion of the uncoated mating part (inner diameter (ID) of gear); and
4. Formation of beneficial transfer films.

In contrast, conventional carbide, nitride and/or oxide coatings (e.g., TiN) do not have low friction in boundary-lubricated conditions. They also are more abrasive to the mating pinion bore than the DLC coatings of the present invention, causing a loose fit and damage related to "rocking" of the gear on the shaft. Further, DLC coatings can be deposited at lower temperatures (e.g. generally not exceeding 150° C.) than can carbides or nitrides. Moreover, the DLC coatings of the present invention form lubricious transfer films in the contact as a consequence of gradual wear, while carbide, nitride arid oxide coatings may not. These lubricious transfer films provide an additional buffer between the pinion shaft and pinions during operation and further minimize wear to the pinion shaft.

Further aspects of the present invention are the resulting hardness, boundary lubricity, and wear resistance characteristics of the coated steel shaft. For example, the hardness of the metal- or silicon-containing carbon material coating is preferably greater than 9 GPa as measured by Berkovich diamond nanoindentation, such that the boundary lubricity and wear resistance characteristics of the coated substrate are generally improved over those of a non-coated steel substrate. The thin film coating may be deposited using a number of processes, such as plasma enhanced chemical vapor deposition, chemical vapor deposition, reactive physical vapor deposition, sputtering or other vapor, ion beam assisted or ablation deposition processes.

The wear resistance, adhesive wear and seizure resistance, boundary lubricity and long life characteristics of the coated pinion shaft 12 are further enhanced if the average maximum height of the Profile $R_z$ (not shown) on the pinion shaft 12 is approximately 0.8 micrometers or less.

Examples of suitable coatings are TiC/ia-C:H, WC/a-C:H, TiC/a-C, CrC/a-C:H, Si/a-C:H and SiO/a-C:H thin films, or a combination of these films, which may be applied to the surface S of the differential pinion shaft 12. A major component of adhesive wear is excessive solid-to-solid adhesion of contacting asperities (e.g. "micro-bonding" or "micro-welding") followed by resultant tearing and subsequent surface damage. Seizure is an extreme case of adhesive wear in which the components cannot move freely. Coating the surface S of the pinion shaft 12 with any of the above-mentioned thin film coatings of the present invention can minimize adhesive interactions of shaft asperities with those on the counter-face (e.g. the inner diameter surface of the pinions 13). This occurs because of the chemical dissimilarity between the coatings of the present invention and the steel counter-face. Because of the chemical dissimilarity, there is a reduced level of chemical interaction between the material comprising the coating and the material of the counter-face. This reduces adhesive wear from micro-bonding and/or micro-welding and thereby reduces tearing and surface damage.

The coating C of the present invention is generally durable under sliding contact and highly wear resistant. The coating C does not promote abrasive wear of the counter-face, and the coating C itself wears in a gradual chemical-mechanical polishing mode which lends a gradual degradation (as opposed to a catastrophic degradation) and longer wear life; this assumes that the initial $R_z$ on the surface S of the pinion shaft 12 is no greater than about 0.8 μm. No masking is required.

Pin-on-disk tests were performed using a CSM tribometer. The tests were unlubricated in air with ball-on-disk contact geometry. The temperature was 21° C. and the relative humidity was ~50%. The sliding speed was 40 cm/s and the normal applied load was 2N giving an initial Hertz contact stress of approximately 1 GPa. SAE Type 52100 steel balls ($R_z$<100 nm) with a 3.97 mm diameter were used as the counter face material against the films. The films were deposited on SAE type 52100 steel coupons with $R_z$<500 nm as measured by atomic force microscopy. The sliding test duration was 2,000 cycles for all tests. Three tests were performed per coating treatment. The steel ball wear rates were calculated by measuring the volume of material removed due to wear on the ball after testing and dividing by the normal applied load and total distance traveled. Both coatings were durable and had excellent adhesion. Coating wear was not detectable in any of the tests.

Variations on the basic construction and processes are available. For example, the thin film coating C may be applied to the inner diameter of one or more of the pinions 13 and not the pinion shaft 12. Alternately, the thin film coating C may be applied to both the pinions 13 and the pinion shaft 12. Moreover, the coating C itself may consist of one or more layers, and not specifically three, so long as the desired levels of adhesion, and chemical and mechanical durability can be achieved. The coating C may also be applied in a variety of other processes, such as chemical vapor deposition, low-pressure chemical vapor deposition, and wet bath chemical deposition, and may be applied in more than one continuous process. Materials, such as chromium, may be used in place of titanium and tungsten for adhesion. The coating may be formulated to exhibit a hardness greater than that of the substance upon which it is bonded.

As various changes could be made in the above constructions without departing from the scope of the invention, it is intended that all matter contained in the above description or shown in the accompanying drawings shall be interpreted as illustrative and not in a limiting sense.

What is claimed is:

1. A differential including as components a pinion shaft and a pinion, the pinion shaft having an outer diameter surface that contacts an inner diameter surface of the pinion, at least one of said pinion shaft and said pinion being coated in a region of the interface between the pinion shaft and pinion with a coating having a lower coefficient of friction than, and being chemically dissimilar to, the other one of said pinion shaft and said pinion, wherein the coating comprises carbon and at least one additive material selected from the group consisting of (a) chromium; (b) chromium carbide; (c) titanium; (d) titanium carbide; (e) tungsten; (f) tungsten carbide; (g) silicon; and (h) silicon carbide, wherein the additive material does not exceed 35 atomic percent of the coating.

2. The differential of claim 1, wherein the coating comprises amorphous carbon and at least one additive material selected from the group consisting of: (a) chromium: (b) chromium carbide: (c) titanium: (d) titanium carbide: (e) tungsten: (f) tungsten carbide: (g) silicon: and (h) silicon carbide, wherein the additive material does not exceed 35 atomic percent of the coating.

3. The differential of claim 1, wherein the coating comprises hydrogenated amorphous carbon and at least one additive material selected from the group consisting of: (a) chromium: (b) chromium carbide: (c) titanium: (d) titanium carbide: (e) tungsten: (f) tungsten carbide: (g) silicon: and (h) silicon carbide wherein the additive material does not exceed 35 atomic percent of the coating.

4. The differential of claim 1, wherein the coating is on both the pinion shaft and the pinion.

5. The differential of claim 1 wherein said coated surface has a maximum profile height ($R_z$) of about 0.8 micrometers or less.

6. The differential of claim 1 wherein said coating comprises at least two layers including an adhesion layer and a final layer.

7. The differential of claim 6 further comprising a gradient layer between the adhesion layer and the final layer.

* * * * *

UNITED STATES PATENT AND TRADEMARK OFFICE
CERTIFICATE OF CORRECTION

PATENT NO. : 7,300,379 B2 Page 1 of 1
APPLICATION NO. : 10/983551
DATED : November 27, 2007
INVENTOR(S) : Gary L. Doll, Carl R. Ribaudo and Ryan D. Evans It is certified that error appears in the above-identified patent and that said Letters Patent is hereby corrected as shown below:

In column 4, third paragraph, line 14, the first formula reads "TiC/ia-C:H" - It should read -- TiC/a-C:H --

Signed and Sealed this

Fifth Day of August, 2008

JON W. DUDAS
*Director of the United States Patent and Trademark Office*